United States Patent
Seok

(10) Patent No.: US 8,787,238 B2
(45) Date of Patent: Jul. 22, 2014

(54) METHOD FOR RETRANSMITTING MULTICAST FRAMES AND METHOD FOR PROCESSING RECEIVED MULTICAST FRAMES IN WIRELESS NETWORK

(71) Applicant: LG Electronics Inc., Seoul (KR)

(72) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 7 days.

(21) Appl. No.: 13/707,225

(22) Filed: Dec. 6, 2012

(65) Prior Publication Data

US 2013/0094429 A1 Apr. 18, 2013

Related U.S. Application Data

(63) Continuation of application No. 12/514,536, filed as application No. PCT/KR2008/005975 on Oct. 10, 2008, now Pat. No. 8,351,365.

(30) Foreign Application Priority Data

Oct. 10, 2007 (KR) .......................... 10-2007-0102304

(51) Int. Cl.
*H04H 20/71* (2008.01)

(52) U.S. Cl.
USPC ........................................................ 370/312

(58) Field of Classification Search
USPC .............. 370/312, 389, 390, 310.2, 331, 328, 370/313, 332, 432, 315, 338, 392, 471, 474
See application file for complete search history.

(56) References Cited

U.S. PATENT DOCUMENTS

| | | | |
|---|---|---|---|
| 6,415,312 B1 | 7/2002 | Boivie | |
| 6,515,994 B1 | 2/2003 | Chuah et al. | |
| 7,013,157 B1 | 3/2006 | Norman et al. | |
| 7,139,838 B1 | 11/2006 | Squire et al. | |
| 2002/0116515 A1* | 8/2002 | Hashimoto | 709/230 |

(Continued)

FOREIGN PATENT DOCUMENTS

| | | |
|---|---|---|
| CN | 1910862 A | 2/2007 |
| CN | 1914844 A | 2/2007 |

(Continued)

OTHER PUBLICATIONS

Seok, IEEE 802.11-0710115r3, Leader based Multicast (Mar. 15, 2007), pp. 1-20.

*Primary Examiner* — Anh Ngoc Nguyen
(74) *Attorney, Agent, or Firm* — Birch, Stewart, Kolasch & Birch, LLP

(57) ABSTRACT

A method for retransmitting a multicast frame in a wireless network and for determining whether a received multicast frame is a duplicated frame. In determining whether the received multicast frame is the same duplicated frame as a previously received multicast frame, a receiver address value and a sequence number of the multicast frame may be used. When fragmentation of a multicast frame is allowed, the value of a fragment number of the multicast frame may be also used, and if it includes a traffic ID, the value of the traffic ID can be also used for determining whether or not the multicast frame is a duplicated frame. If a multicast frame is transmitted in a wireless mesh network, it is determined whether or not the multicast frame is a duplicated one by using a mesh source address, a mesh destination address, and a sequence number.

8 Claims, 7 Drawing Sheets

(56) References Cited

U.S. PATENT DOCUMENTS

| | | |
|---|---|---|
| 2004/0184471 A1 | 9/2004 | Chuah et al. |
| 2005/0204250 A1 | 9/2005 | Hong et al. |
| 2007/0002818 A1* | 1/2007 | Steer et al. .................... 370/344 |
| 2007/0133456 A1 | 6/2007 | Ding |
| 2007/0286121 A1 | 12/2007 | Kolakowski et al. |
| 2007/0288824 A1 | 12/2007 | Yeo et al. |

FOREIGN PATENT DOCUMENTS

| | | |
|---|---|---|
| KR | 2000-0032311 A | 6/2000 |
| KR | 10-2004-0083360 A | 10/2004 |
| WO | 01/50672 A1 | 7/2001 |
| WO | WO 2008/063917 A1 | 5/2008 |
| WO | WO 2008/110894 A2 | 9/2008 |

* cited by examiner

METHOD FOR RETRANSMITTING MULTICAST FRAMES AND METHOD FOR PROCESSING RECEIVED MULTICAST FRAMES IN WIRELESS NETWORK

CROSS-REFERENCE TO RELATED APPLICATIONS

This application is a Continuation of co-pending application Ser. No. 12/514,536 filed on May 12, 2009, which is the national phase of PCT International Application No. PCT/KR2008/005975 filed on Oct. 10, 2008, and which claims priority to Application No. 10-2007-0102304 filed in the Republic of Korea on Oct. 10, 2007. The entire contents of all of the above applications are hereby incorporated by reference.

TECHNICAL FIELD

The present invention relates to multicasting in a wireless network and, more particularly, to transmission of multicast (MC) frames and processing received MC frames in a wireless network.

BACKGROUND ART

Generally, a wireless local area network (WLAN) is a typical wireless network. Unlike the conventional wired LAN, the WLAN uses a wireless medium as a medium for a data transmission, without the necessity of connection of a cable used for the conventional wired LAN. Currently, the WLAN transmits and receives data by using radio resources, and as such, the WLAN receives much attention to extend or substitute the conventional wired LAN.

The WLAN is based on the IEEE 802.11 standards of the IEEE (Institute of Electrical and Electronics Engineers). When multicast is applied to an MSDU (Medium Access Control Service Data Unit), it is an MSDU having a multicast address as a receiver address (RA) or a destination address (DA). When the multicast address is applied to an MPDU (Medium Access Control Protocol Data Unit) or a control frame, it is an MPDU or a control frame having a multicast address as an RA. Here, the multicast address refers to a MAC (Medium Access Control) address having a group bit set. The MSDU refers to information transferred to a unit between MAC service access points. The MPDU refers to a unit of data exchanged between two equal MAC layers by using a service of a physical layer.

In the WLAN, data is transmitted by using a DCF (Distributed Coordination Function), and the DCF, a basic medium access scheme of IEEE 802.11, is to share a medium between terminals by using a CSMA/CA (Carrier Sense Multiple Access with Collision Avoidance) protocol and a random backoff time. Transmission of every unicast frame is checked through acknowledgement (ACK) signal, and if there is no response within an ACK signal standby time, retransmission is attempted. If the ACK signal is not received until even after retransmission is attempted several times (e.g., five to 21 times), the unicast frame is discarded. This means a transmission failure.

However, transmission of a broadcast frame and a multicast frame is not checked by using such an ACK signal. Namely, the MAC of IEEE 802.11 standards basically supports the unicast frame but not the broadcast frame nor a multicast frame.

As a result, transmission of the broadcast frame and multicast frame has a high probability of a transmission failure due to interference of adjacent channels, multi-path fading, or the like, and because there is no retransmission, one time of failure makes the frame discarded. This means a failure of radio (wireless) transmission of the multicast frame. That is the characteristics of the radio (wireless) environment contrasted with a fixed line environment, in which transmission of multicast frames can hardly guarantee a stable reception due to the transmission failure, and QoS (Quality of Service) is irregular according to a channel state. Thus, the related art radio transmission of multicast frames has a high possibility of a failure and degrades QoS.

DISCLOSURE

Technical Problem

The present invention is designed to solve such a problem of the related art, and therefore, an object of the present invention is to provide a method for retransmitting a multicast frame, if a previous multicast frame has not been properly transmitted, to thereby enhance the reliability of reception of the multicast frame.

Another object of the present invention is to provide a method for retransmitting a new type of multicast frame whereby retransmission is made only to a station that supports retransmission, without allowing retransmission of a multicast frame to a legacy station that does not support retransmission of multicast frame.

Still another object of the present invention is to provide a method for processing a received multicast frame to determine whether or not a multicast frame received by a station supporting retransmission is a duplicated frame resulting from retransmission.

Technical Solution

To achieve the above objects, there is provided in one aspect a method for retransmitting a multicast frame, including: determining, by a transmitter device which has transmitted a first multicast frame, whether or not retransmission of the first multicast frame is required; and if retransmission of the first multicast frame is required, transmitting, by the transmitter device, a second multicast frame if only a station (STA) supporting retransmission exists.

To achieve the above object, there is provided in another aspect a method for retransmitting a multicast frame, including: determining, by a transmitter device which has transmitted a first multicast frame including a sequence number field and a receiver address (RA) field, whether or not retransmission of the first multicast frame is required; and if retransmission of the first multicast frame is required, forming, by the transmitter device, a second multicast frame which has the same value of the sequence number field and the same value of the receiver address field and has a different type from that of the first multicast frame, and transmitting the second multicast frame.

To achieve the above object, there is provided in still another aspect a method for retransmitting a multicast frame, including: determining, by a transmitter device which has transmitted a first multicast frame having a first transmitter address (TA1), whether or not retransmission of the first multicast frame is required; and if retransmission of the first multicast frame is required, forming, by the transmitter device, a second multicast frame having a second transmitter address (TA2) different from the first transmitter address (TA1) and transmitting the second multicast frame.

To achieve the above object, there is provided in yet another aspect a method for retransmitting a multicast frame, including: determining, by a transmitter device which has transmitted a first multicast frame having a first multicast group address as a receiver address (RA), whether or not retransmission of the first multicast frame is required; and if retransmission of the first multicast frame is required, forming, by the transmitter device, a second multicast frame having a second multicast group address different from the first multicast group address as a receiver address (RA) and transmitting the second multicast frame.

Advantageous Effects

In the present invention, when retransmission of a multicast frame is required, a station that supports retransmission can receive the multicast frame again. When the station repeatedly received the frame which has been already received, it can recognize the retransmission of the multicast frame by using a receiver address and a sequence number together, and thus, it can discard the repeatedly received frame (duplicated frame). A legacy station that does not support retransmission cannot recognize a new type of multicast frame (setting of a new multicast group address and/or a retransmission bit), so it will discard the multicast frame, and thus, repeatedly receiving of the frame can be prevented. When a station supports retransmission and a retransmission bit is set to be 1, the station can map a new multicast group address set in the receiver address to an original multicast group address in a one-to-one manner and then discriminate whether or not a corresponding multicast frame is a duplicated frame by using the at least receiver address and the multicast group address information.

MODE FOR INVENTION

Figure 1:
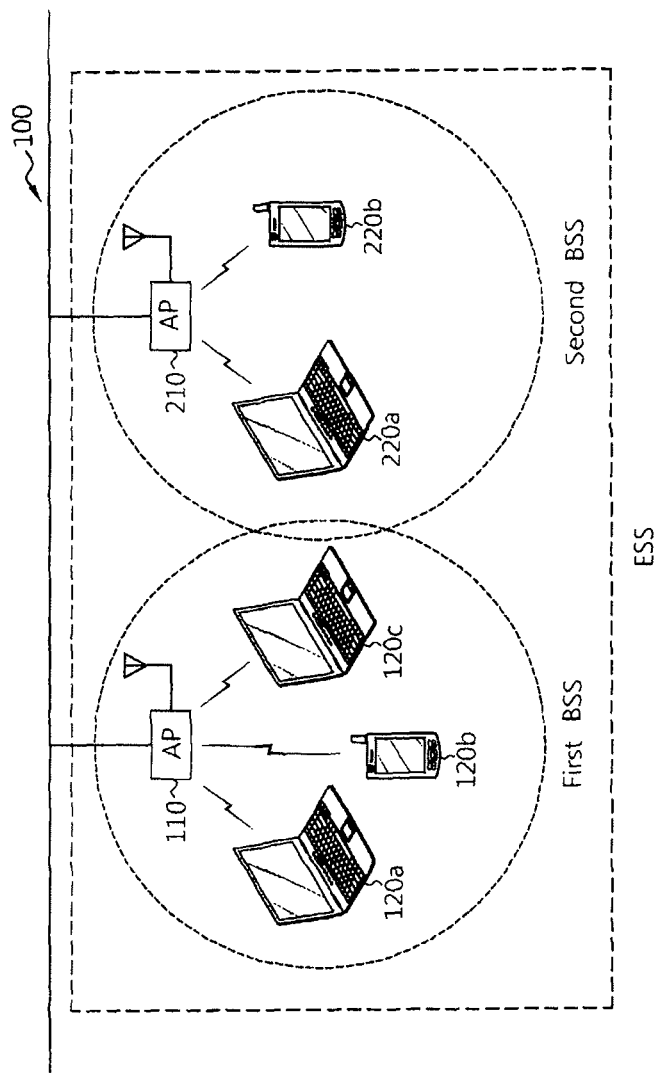
FIG. 1 is a drawing illustrating the configuration of a WLAN (Wireless Local Area Network).as an example of a wireless network.

FIG. 1 is a drawing illustrating the configuration of a WLAN (Wireless Local Area Network) as an example of a wireless network. FIG. 1 relates to a WLAN according to IEEE 802.11 standards, and the WLAN is merely an example of a wireless network. Thus, the present invention may be applicable to the general wireless network as well as to the WLAN.

With reference to FIG. 1, a WLAN system 100 includes access points (APs) 110 and 210, and stations (STA) 120a, . . . , 220b. The APs 110 and 210 have a function of a wireless station and are function entities providing a connection with respect to a distributed service by way of a wireless medium for an associated station. The APs 110 and 210 are examples of transmitter devices and handle a function of transmitting a multicast frame, a function of determining whether or not the multicast frame has been properly transmitted and/or a function of forming and transmitting a new type of multicast frame if the multicast has not been properly transmitted. Besides the name of APs, the APs 110 and 210 may be also called centralized controllers, base stations (BSs), Node-Bs, site controllers, or the like. The stations 120a, . . . , 220b are arbitrary devices including a medium access control (MAC) and physical layer interface in conformity with IEEE 802.11 standards with respect to a wireless medium. The stations 120a, . . . , 220b handle a function of receiving a multicast frame. A legacy station that does not support retransmission cannot recognize a retransmitted multicast frame, while a station that supports retransmission can recognize the retransmitted multicast frame. Besides the name of wireless station, the stations 120a, . . . , 220b may be also called wireless transmit/receiver units (WTRUs), user equipments (UEs), mobile stations (MSs), mobile subscriber units, or the like.

The WLAN system 100 may be divided into two types depending on whether or not it includes the APs 110 and 210. Namely, a type of WLAN system including the APs 110 and 210 is called an infrastructure basic service set (IBSS), while a type of WALN system that does not have such APs 110 and 210 is called an ad-hoc network (not shown).

A service area provided by a single AP 110 is called a basic service area (BSA), and a mobile terminal connected to the AP 110 is called a basic service set (BSS).

Connection of the mobile terminal to the AP 110 to receive a service is called a station service (SS). The SS includes a service exchanged by stations in the ad-hoc network. As shown in FIG. 1, the BSAs, namely, service areas, may overlap with each other. Two or more APs 110 and 210 may interwork to allow the stations 120a, 120b, and 120c connected with one AP 110 to communicate with the stations 220a and 220b connected with another AP 210. In this case, the connections of APs 110 and 210 are called a distributed system (DS), and a service provided via the DS is called a distributed system service (DSS).

An area to which the DSS can be provided is called an extended service area (ESA), and all the stations 120a, . . . , 220b receiving the DSS in the ESA and the APs 110 and 210 en masse are called an extended service set (ESS). In general, the ESS is connected with one or more APs 110 and 210 in the WLAN, so networks are discriminated by an ESSID.

Figure 2:
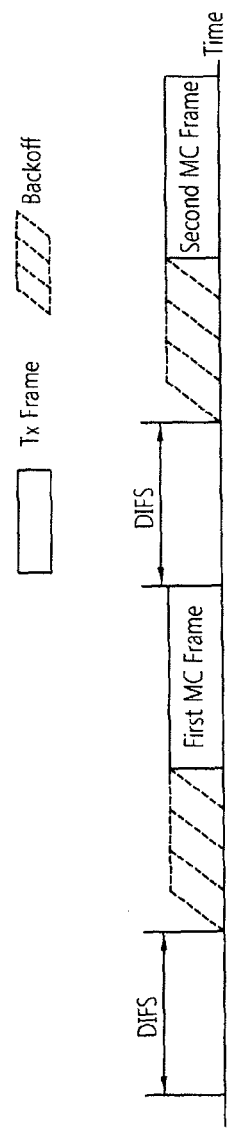
FIG. 2 is a drawing illustrating a process of normally transmitting a multicast frame in the wireless network.

FIG. 2 is a drawing illustrating a process of normally transmitting a multicast frame in the wireless network. Here, MC frames refer to multicast frames.

With reference to FIG. 2, multicast frames are normally transmitted in the WLAN. That is, a first MC frame is transmitted, a distributed inter-frame space (CIFS) comes, a back-off algorithm is conducted without a process of receiving an acknowledgement (ACK) signal, and then, a second MC frame is transmitted.

Figure 3:
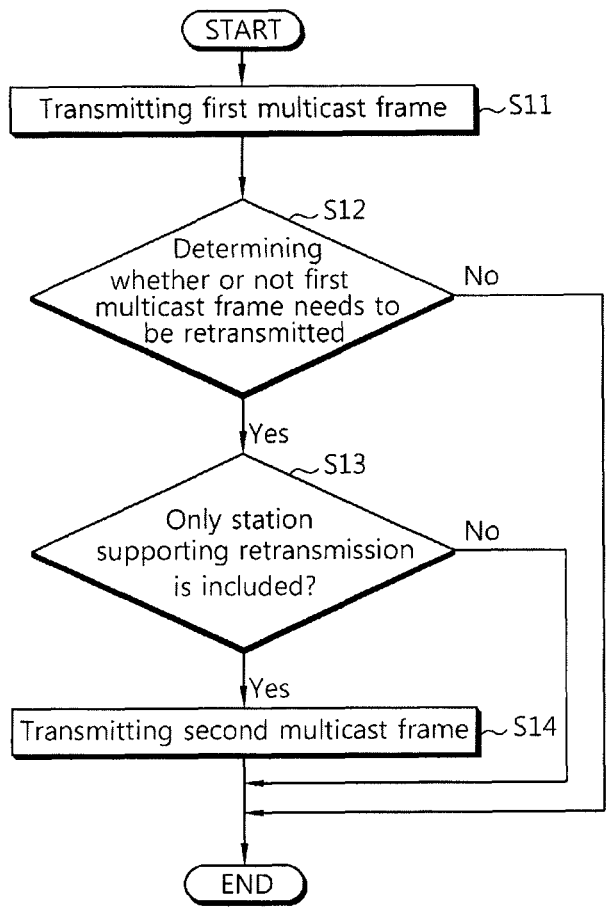
FIG. 3 is a flow chart illustrating the process of a method for retransmitting a multicast frame in a wireless network according to a first embodiment of the present invention.
Figure 4:
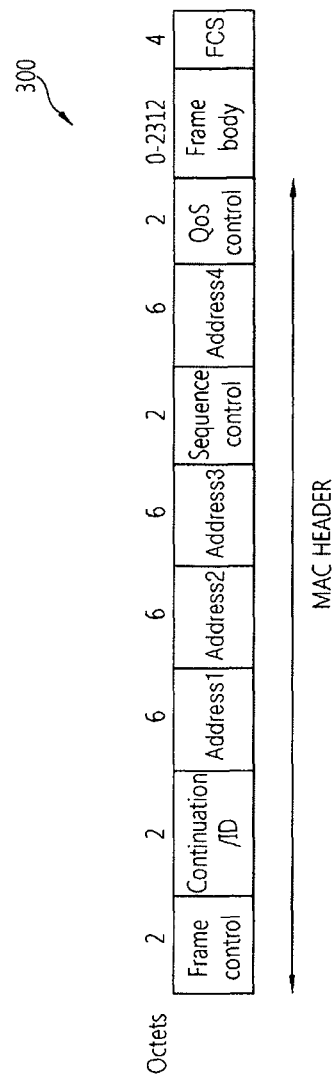
FIG. 4 is a drawing illustrating the configuration of a data frame, an example of the multicast frame.

FIG. 3 is a flow chart illustrating the process of a method for retransmitting a multicast frame in a wireless network according to a first embodiment of the present invention, and FIG. 4 is a drawing illustrating the configuration of a data frame, an example of the multicast frame.

With reference to FIG. 3, first, a transmitter device transmits the first multicast frame (S11). Here, the first multicast frame is a message the AP wants to transmit to a destination device, and it can be, for example, a data frame 300 as shown in FIG. 4.

The data frame 300 includes a frame control field, a continuation/ID field, an address field, a sequence control field, a QoS (Quality of Service) control field, a frame body field and/or FCS (Frame Check Sequence) field.

The frame control field is a portion of a MAC header and includes a version and a type of a protocol. The frame control field serves to control a frame. The continuation/ID field is a portion of the MAC header and has a length of 16 bits. The range of the continuation/ID field changes according to a frame type. The address field is a portion of the MAC header. The address field is a portion of the MAC header and includes two address fields used to indicate a BSSID, a source address (SA), a destination address (DA), a transmitter address (TA), and/or a receiver address (RA). The sequence control field is a portion of the MAC header, has a length of 16 bits, and includes a fragment number and a sequence number. The QoS control field is a portion of the MAC header, has a length of 16 bits, and controls QoS. The frame type of the data frame 300 is dependent upon the QoS control field, so the data frame 300 is occasionally called a QoS data frame. The frame body field is a variable length field including particular information of each frame type. The length of the frame body field starts from a minimum 0 octat. The FCS field is a 32-bit length field including a cyclic redundancy check (CRC) of 32 bits. The FCS field is calculated over the both MAC header and the frame body field. Thus, the FCS field is called a calculation field.

With reference to FIG. 3, it is determined whether or not retransmission of the first multicast frame, which has been transmitted in step S11, is required (S12).

The first multicast frame may be retransmitted in many cases. For example, if the first multicast frame collides to fail to be transmitted, it may be retransmitted. Here, there is no limitation in determining whether or not the first multicast frame has collided, and for example, the following methods may be used.

First, after the first multicast frame is transmitted, a channel state is checked through a physical carrier detection (sense). If the channel is not in an idle state, it may be determined that the multicast frame has collided. Not every multicast collisions may be detected. Here, the physical carrier detection may be one of methods for detecting carriers, which is provided by a physical layer.

Second, after the first multicast frame is transmitted, if there is no channel access during a period of an Extended Interframe Space (EIFS), it may be considered that collision has occurred. Not every multicast frames may be determined to have collided. The EIFS may be used to provide a sufficient time for a reception station to send an ACK frame, when there is an error in a frame transmission at a DCF (Distributed Coordination Function)-based station.

With reference to FIG. 3, when retransmission of the first multicast frame is determined to be required, it is determined whether or not a BSS includes only stations supporting retransmission (S13).

If a destination device of the first multicast frame includes only stations supporting retransmission, a second multicast frame is transmitted (S14). Here, the type of the second multicast frame may be the same as or different from that of the first multicast frame. Although the type of the second multicast frame is different from that of the first multicast frame, a frame body may be the same.

If the destination device includes only a legacy station(s) that does not support retransmission, the second multicast frame does not need to be transmitted. If the destination device includes both the legacy station not supporting retransmission and the station supporting retransmission and if the second multicast frame is the same as the first multicast frame, the second multicast frame is not transmitted. This is because, if the second multicast frame is the same as the first multicast frame and the second multicast frame is transmitted, the legacy station, which has received the first multicast frame, would receive the second multicast frame and transfer it to an application layer, causing a problem that the same frame is received and processed. However, if the second multicast frame is different from the first multicast frame, the legacy station would discard it because it cannot recognize the second multicast frame, causing no problem.

Figure 5:
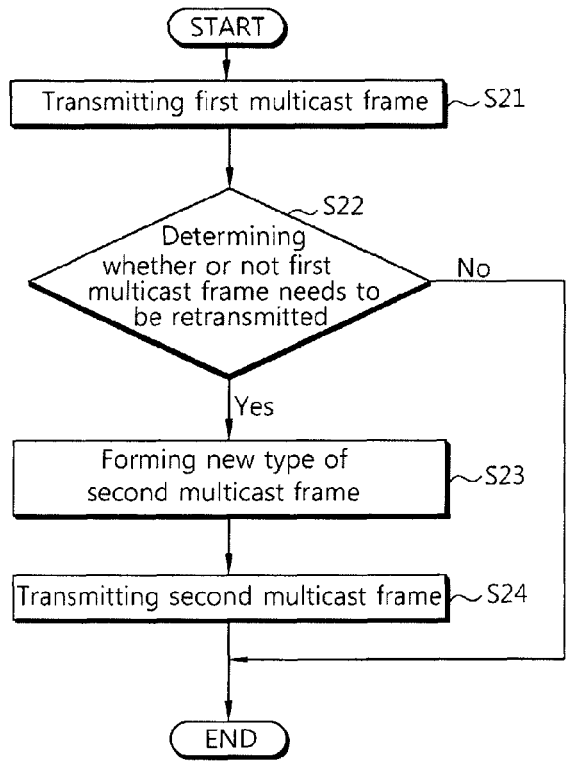
FIG. 5 is a flow chart illustrating the process of a method for retransmitting a multicast frame in a wireless network according to a second embodiment of the present invention.

FIG. 5 is a flow chart illustrating the process of a method for retransmitting a multicast frame in a wireless network according to a second embodiment of the present invention. Here, the second embodiment of the present invention is the same as the first embodiment of FIG. 3, except that the second multicast frame is changed to a new type of multicast frame, so the description of the second embodiment of the present invention will be focused on the difference.

With reference to FIG. 5, first, the transmitter device transmits a first multicast frame (S21). The first multicast frame may be a multicast frame having such a form as shown in FIG. 4.

Next, the transmitter device determines whether or not the first multicast frame needs to be retransmitted (S22). The first multicast frame may be retransmitted in several cases. For example, if the first multicast frame collides to fail to be transmitted, the first multicast frame needs to be retransmitted. Here, there is no limitation in determining whether or not the first multicast frame has collided, and the above-mentioned methods may be used.

When it is determined that the first multicast frame needs to be retransmitted, a new type of second multicast frame, different from the type of the first multicast frame, is formed (S23). The second multicast frame includes the same sequence number and receiver address as those of the first multicast frame.

The sequence number may indicate a sequence number of an MSDU (MAC Service Data Unit) or an MPDU (MAC Protocol Data Unit).

Next, the transmitter device transmits the new type of second multicast frame different from the first multicast frame (S24). Accordingly, the legacy station not supporting retransmission cannot recognize the new type of second multicast frame, so it discards the received frame. Meanwhile, a station supporting retransmission can recognize the new type of second multicast frame, so it can determine whether or not it is a duplicated multicast frame by using the sequence number and the receiver address value of the received second multicast frame. If the received multicast frame is determined to be a duplicated multicast frame, the station supporting retransmission discards it. Namely, the terminal compares the sequence number and the receiver address of the re-transmitted multicast frame with information stored in a cache or the like, and if there is the same information, the terminal regards the received frame as a duplicated multicast frame and discards it.

Figure 6:
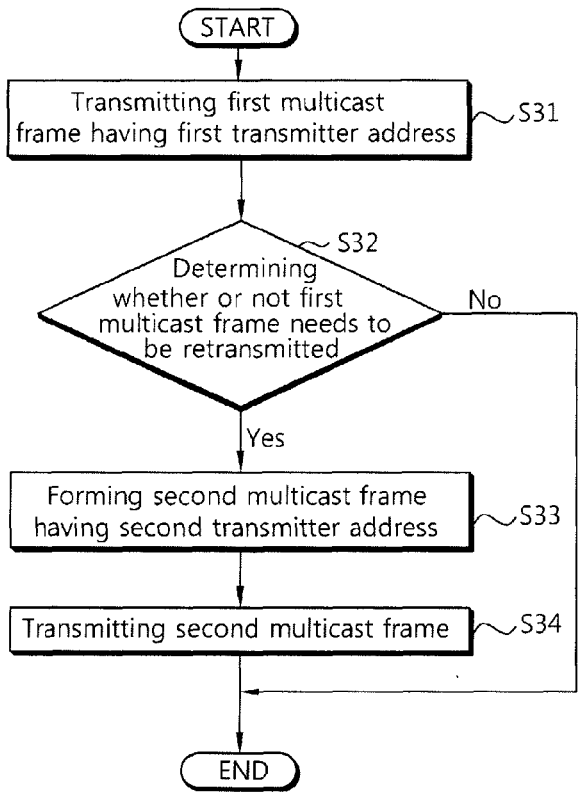
FIG. 6 is a flow chart illustrating the process of a method for retransmitting a multicast frame in a wireless network according to a third embodiment of the present invention.

FIG. 6 is a flow chart illustrating the process of a method for retransmitting a multicast frame in a wireless network according to a third embodiment of the present invention.

With reference to FIG. 6, first, the transmitter device transmits a first multicast frame having a first transmitter address (S31). The first multicast frame may be a multicast frame having such a form as shown in FIG. 4.

Next, the transmitter device determines whether or not the first multicast frame needs to be retransmitted (S32). The first multicast frame may be retransmitted in several cases. For example, if the first multicast frame collides to fail to be transmitted, the first multicast frame needs to be retransmitted. Here, there is no limitation in determining whether or not the first multicast frame has collided, and the above-mentioned methods may be used.

When it is determined that the first multicast frame needs to be retransmitted, the transmitter device forms a second multicast frame having a second transmitter address different from the first transmitter address (S33). Here, although the first and second transmitter addresses have different values, respectively, they may have such relationship that the station supporting retransmission can recognize them as the same. For example, the first transmitter address may be an actual MAC address, namely, an actual BSSID, of the transmitter device, and the second transmitter address may be a virtual MAC address, namely, a virtual BSSID, of the transmitter device. The BSSID is a unique ID of the BSS (Basic Service Set).

Next, the transmitter device transmits the second multicast frame having the second transmitter address (S34). In this case, because the second transmitter address of the second multicast frame is different from the first transmitter address, the legacy station that does not support retransmission discards the second multicast frame. Meanwhile, the station that supports retransmission can recognize the second transmitter address of the second multicast frame as the address of the first multicast frame (e.g., when it recognizes that the already known virtual BSSID corresponds to the BSSID of the transmitter device), so it can determine whether or not the frame is a duplicated multicast frame by using a sequence number and a receiver address of the received second multicast frame. If the frame is determined to be a duplicated frame, the station discards it. Namely, the terminal compares the sequence number and the receiver address of the re-transmitted multicast frame with information stored in the cache or the like, and if there is corresponding information or the same information, the terminal regards the received frame as a duplicated multicast frame and discards it.

Figure 7:
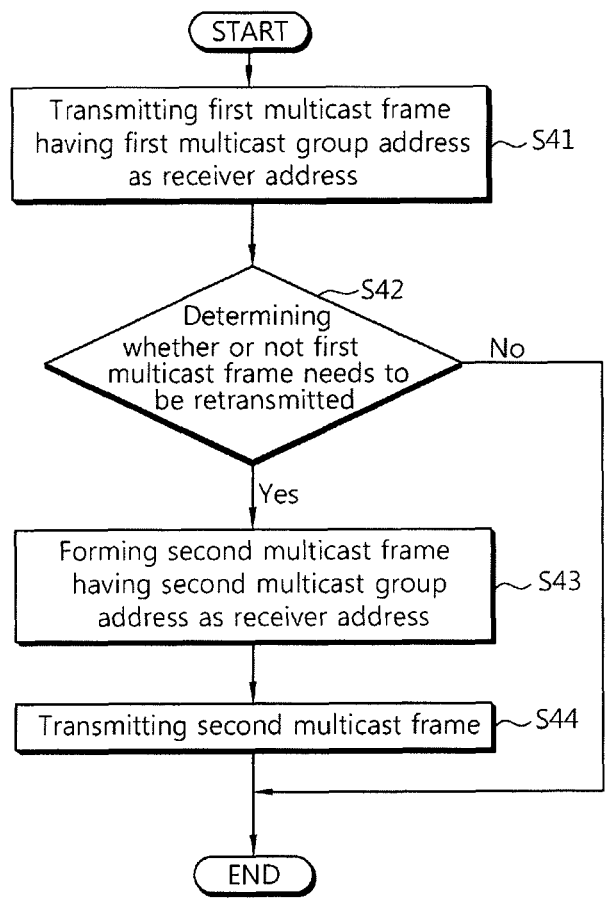
FIG. 7 is a flow chart illustrating the process of a method for retransmitting a multicast frame in a wireless network according to a fourth embodiment of the present invention.

FIG. 7 is a flow chart illustrating the process of a method for retransmitting a multicast frame in a wireless network according to a fourth embodiment of the present invention.

With reference to FIG. 7, first, the transmitter device transmits a first multicast frame having a first multicast group address as a receiver address (S41). The first multicast frame may be a multicast frame having such a form as shown in FIG. 4.

Next, the transmitter device determines whether or not the first multicast frame needs to be retransmitted (S42). The first multicast frame may be retransmitted in several cases. For example, if the first multicast frame collides to fail to be transmitted, the first multicast frame needs to be retransmitted. Here, there is no limitation in determining whether or not the first multicast frame has collided, and the above-mentioned methods may be used.

When it is determined that the first multicast frame needs to be retransmitted, the transmitter device forms a second multicast frame having a receiver address as a second multicast group address different from a first multicast group address (the original multicast group address) (S43).

The second multicast group address may be a MAC address mapped to the first multicast group address in a one-to-one manner, and when a multicast frame of the first multicast group address is retransmitted, a corresponding second multicast group address is used as a receiver address and retransmitted.

Figure 8:
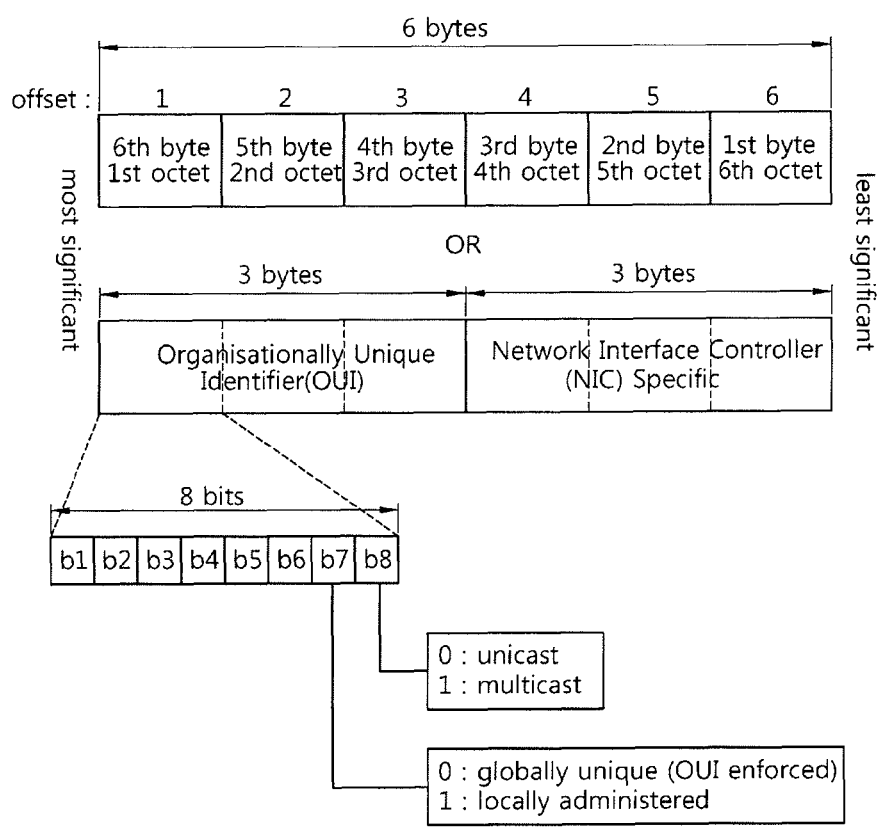
FIG. 8 is a drawing illustrating the configuration of an example of an Ethernet address format.

As one example of the second multicast group address, a local multicast group address may be utilized. For example, a local multicast group address obtained by setting a bit b7 of an MSB (Most Significant Bit) of the Ethernet address format as shown in FIG. 8 as 1 may be used as the second multicast group address. In this case, the local multicast group address does not cause collision with a globally unique multicast group address.

Next, the transmitter device transmits the second multicast frame (S44). Accordingly, because the legacy station not supporting retransmission has not joined the second multicast group address, it discards the second multicast frame. Meanwhile, upon receiving the second multicast frame, the station supporting retransmission can recognize the second multicast group address, the receiver address, as the first multicast group address, so it can determine whether or not the frame is a duplicated multicast frame by using a sequence number and the receiver address of the received second multicast frame. If the frame is determined to be a duplicated frame, the station discards it. Namely, the terminal compares the sequence number and the receiver address of the re-transmitted multicast frame with information stored in the cache or the like, and if there is the same information, the terminal regards the received frame as a duplicated multicast frame and discards it.

If it is allowed to fragment a multicast frame and transmit the same, a single multicast frame may be fragmented and thusly transmitted. In this case, frames including each fragment may have the same sequence number but different fragment numbers. Thus, when fragmentation of a multicast frame is allowed, it is determined whether or not the multicast frame is a duplicated frame by using an address receiver, a sequence number and a fragment number. To this end, a transmitter address, the receiver address, the sequence number, and the fragment number of the received multicast frame are stored or maintained in the cache.

If a QoS data type of multicast frames are received, sequence numbers may be sequentially assigned to the multicast frames according to a traffic ID (TID). In this case, if frames have the same sequence number but different TIDs, they are different frames, while if frames have the same sequence number and TIDs, they are the same frames. Thus, when the QoS data type of multicast frames are received, a transmitter address, a receiver address, the sequence number and the TIDs are stored or maintained in the cache. And it is determined whether or not the received multicast frames are duplicated ones of already received multicast frames by using all the stored or maintained information.

If multicast frames are retransmitted in a wireless mesh network, the terminal stores or maintains a destination multicast address, a source address, and a sequence number of the received multicast frames in the cache. The destination multicast address is also called a mesh destination multicast address, and the source address is also called a mesh source address. If fragmentation of the multicast frame is allowed, fragment numbers may be also maintained or stored in the cache. Or, when the QoS data type of multicast frame is received, the TID may be also maintained or stored in the cache.

Thus, upon receiving a multicast frame, first, the terminal determines whether or not a retransmission bit is '1'. If the retransmission bit has been set to '1', the terminal compares at least the transmitter address, the receiver address, and the sequence number of the received multicast frame with the values maintained in the cache. If fragmentation of the multicast frame is allowed, the terminal may also compare the fragment numbers. If the terminal receives the QoS data type of multicast frame, it may also compare the TIDs.

In the wireless mesh network, upon receiving the multicast frame, first, the terminal determines whether a retransmission bit is '1'. If the retransmission bit has been set to be '1', the terminal compares at least the destination multicast address, the source address and the sequence number of the received multicast frame with the values maintained in the cache. If fragmentation of the multicast frame is allowed, the terminal may also compare the fragment numbers. If the QoS data type of multicast frame is received, the terminal may also compare the TIDs.

Data to be stored in the cache to detect by the terminal whether or not retransmitted multicast frames are duplicated frames, when the multicast frames are retransmitted, will now be described.

In the method for retransmitting multicast frames in the wireless network according to the embodiments of the present invention, the first and second multicast frames have the same sequence number. In addition, the first and second multicast frames in the second and third embodiments of the present invention have the same receiver address. In the fourth embodiment, the station supporting retransmission have the receiver address used for recognizing the same.

Accordingly, in order to detect whether or not a retransmitted frame is a duplicated frame, at least the sequence number and the receiver address of the already received multicast frame need to be stored as a tuple in the cache of the reception station. When fragmentation of the multicast frame is allowed, the fragment numbers should be also stored together with the sequence number and the receiver address as a tuple in the cache. This is because, when the terminal receives a multicast frame including a fragment number, it should compare the sequence number and the fragment number together in order to determine whether or not the re-transmitted frame is a duplicated frame. When the terminal supports QoS and receives the QoS type of multicast frame, it should store the TID together with the sequence number and the receiver address as a tuple in the cache. The sequence number of the QoS data type of multicast frame is defined by TID, so in order to detect whether or not the retransmitted frame is a duplicated frame, the TID and the sequence number should be compared together.

In addition, in order to detect whether or not a re-transmitted frame of a received frame is a duplicated frame, the terminal may store all the transmitter address, the receiver address, and the sequence number in the cache to use them (e.g., multicast in the IBSS). When the terminal receives a multicast frame including a fragment number, it may additionally store the fragment number. When the terminal receives the QoS type of multicast frame, it may additionally store the TID.

In this manner, the terminal stores the receiver address and the sequence number (possibly including one or both of the fragment number and the TID according to a type of a transmitted multicast frame) of a received multicast data frame in the cache. Thus, when the terminal receives a multicast data frame in which a retry bit is set to be '1', it can recognize the received multicast data frame as a retransmitted multicast frame and compare the receiver address, the sequence number, and the like, of the retransmitted multicast frame with the information stored in the cache to thereby determines whether or not the frame has been already received.

In case where a new multicast group address, which cannot be recognized by the legacy station, is used as the receiver address of the retransmitted multicast frame, when the terminal receives a multicast frame with a retransmission bit set as '1', the terminal needs to replace the value of the receiver address with the existing multicast group address value. The method for replacing the new multicast group address with the existing multicast group address is not limited. For example, a method of using a table in which the new multicast group address and the existing multicast group address are mapped in a one-to-one manner or a method of converting the value of the new multicast group address according to a certain rule, or the like, may be used.

The foregoing description of the preferred embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

Industrial Applicability

The present invention can be applicable to a multicast service in a wireless network.

The invention claimed is:

1. A method of multicasting data in a wireless communication network, comprising:
   transmitting, by a transmitter, a first multicasting frame, the first multicasting frame including a first receiver address, a first transmitter address and a first retry bit, the first receiver address including a first multicasting address, the first retry bit being set to zero; and
   transmitting, by the transmitter, a second multicasting frame, the second multicasting frame including a second receiver address, a second transmitter address and a second retry bit, the second receiver address including a second multicasting address, the second transmitter address being same as the first transmitter address, the second retry bit being set to one,
   wherein, if the second multicasting frame is a retransmission of the first multicasting frame, the second multicasting address is different from the first multicasting address,
   wherein the first and second multicasting addresses each include a corresponding plurality of bits, and
   wherein at least one bit of the second multicasting address is set to a different value than at least corresponding bit of the first multicasting address so that a legacy receiving device which does not support multicast retransmission does not process the second multicasting frame.

2. The method of claim 1, wherein the second multicasting frame further includes a destination address including the first multicasting address.

3. The method of claim 1, wherein the second multicasting frame is transmitted without receiving a request for the retransmission of the first multicasting frame.

4. The method of claim 1, wherein the second multicasting address is a predetermined multicasting address.

5. An apparatus for transmitting multicast data in a wireless communication network, the apparatus comprising:
   a transmitting device configured to
   transmit a first multicasting frame, the first multicasting frame including a first receiver address, a first transmitter address and a first retry bit, the first receiver address including a first multicasting address, the first retry bit being set to zero, and
   transmit a second multicasting frame, the second multicasting frame including a second receiver address, a second transmitter address and a second retry bit, the second receiver address including a second multicasting address, the second transmitter address being same as the first transmitter address, the second retry bit being set to one, wherein, if the second multicasting frame is a retransmission of the first multicasting frame, the second multicasting address is different from the first multicasting address, wherein the first and second multicasting addresses include a corresponding plurality of bits, and wherein at least one bit of the second multicasting address is set to a different value than at least corresponding bit of the first multicasting address so that a legacy receiving device which does not support multicast retransmission does not process the second multicasting frame.

6. The apparatus of claim 5, wherein the second multicasting frame further includes a destination address including the first multicasting address.

7. The apparatus of claim 5, wherein the second multicasting frame is transmitted without receiving a request for the retransmission of the first multicasting frame.

8. The apparatus of claim 5, wherein the second multicasting address is a predetermined multicasting address.

* * * * *